United States Patent [19]

Hale et al.

[11] Patent Number: 4,724,594
[45] Date of Patent: Feb. 16, 1988

[54] APPARATUS FOR ADJUSTING THE ELEVATION OF FUEL RODS IN A NUCLEAR REACTOR FUEL ASSEMBLY

[75] Inventors: David L. Hale, Lexington; Thomas F. Culbreth, Columbia, both of S.C.

[73] Assignee: Westinghouse Electric Corp., Pittsburgh, Pa.

[21] Appl. No.: 844,421

[22] Filed: Mar. 26, 1986

[51] Int. Cl.$^4$ .............................................. B23P 19/04
[52] U.S. Cl. ..................................... 29/261; 376/261
[58] Field of Search ........................... 29/259, 260–263, 29/271, 280; 269/48.1; 376/261

[56] References Cited

U.S. PATENT DOCUMENTS

| | | | |
|---|---|---|---|
| 1,570,338 | 1/1926 | Davis | 29/262 |
| 1,632,720 | 6/1927 | Worster | 29/262 X |
| 1,804,843 | 5/1931 | Santiago | 29/262 |
| 1,851,421 | 3/1932 | Conklin | 29/263 X |
| 2,429,053 | 10/1947 | Forbes, Jr. | 269/48.1 X |
| 2,614,318 | 10/1952 | McCord | 29/263 |
| 2,804,787 | 9/1957 | Fuchs, Jr. | 269/48.1 |
| 3,340,593 | 9/1967 | Savastano | 29/262 |
| 3,367,011 | 2/1968 | Sipher | 29/280 X |
| 4,265,010 | 5/1981 | Doss et al. | 376/261 X |
| 4,575,930 | 3/1986 | Blickenderfer | 376/261 X |

OTHER PUBLICATIONS

Westinghouse U.S. Patent Application Ser. No. 06/564,054.

*Primary Examiner*—Robert C. Watson

[57] ABSTRACT

An apparatus for adjusting the level of nuclear fuel rods in a fuel assembly is disclosed, and which comprises a tool composed of an expander having a pair of parallel, laterally spaced apart and flexible arms which have first ends which are interconnected to each other, and opposite free ends. The tool further includes an actuator disposed between the free ends of the arms, and the free ends of the arms and the actuator mount cooperating wedge surface means, whereby relative longitudinal movement between the expander and actuator causes the arms to separate a predetermined maximum distance. In use, the tool is inserted into the fuel assembly with the free ends of the arms located between the end of a misaligned fuel rod and the nozzle, and the actuator is then longitudinally advanced to separate the arms to the predetermined maximum distance, which serves to move the misaligned rod to its proper level. During the separation of the arms, the arms may be manually pressed toward each other so that the free ends are maintained in a parallel relationship and so as to avoid lateral forces being imparted to the misaligned fuel rod.

6 Claims, 4 Drawing Figures

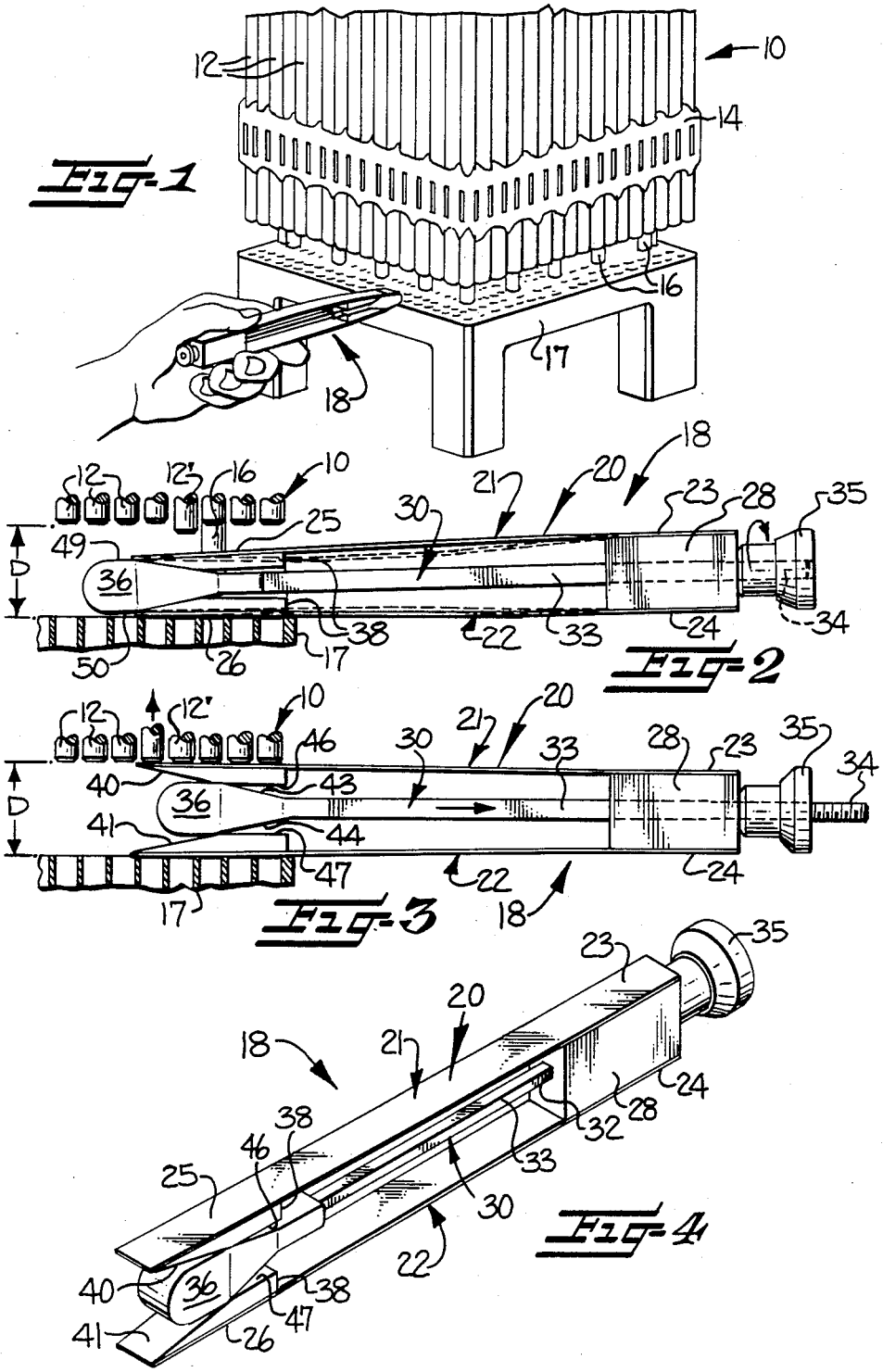

APPARATUS FOR ADJUSTING THE ELEVATION OF FUEL RODS IN A NUCLEAR REACTOR FUEL ASSEMBLY

BACKGROUND OF THE INVENTION

1. Field of the Invention

The present invention relates to an apparatus and method for adjusting the level of a nuclear fuel rod in a nuclear reactor fuel assembly.

2. Description of the Prior Art

Conventional fuel assemblies of the type used in commercial nuclear reactors for generating electric power typically comprise a plurality of fuel rods, with each rod including a stack of fuel elements mounted inside a metal tube which is sealed by end plugs. The fuel rods are held in a laterally spaced apart generally rectangular arrangement by a supporting "skeleton" which consists of a number of grids which are spaced at lengthwise intervals along the length of the assembly. The fuel rods are individually mounted to the grids by means of spring mountings, which permit limited axial movement of each rod. Control rod guide thimbles extend parallel to the rods and serve to interconnect the grids, and the guide thimbles extend axially beyond the ends of the rods for mounting top and bottom nozzles.

It is important for the proper functioning of the fuel rods that all of the rods be positioned in the assembly at the same level, and so that the ends of all of the rods lie in the same plane at each end of the assembly. Thus each end of each rod should be spaced from the adjacent nozzle a predetermined gap distance. However, when the fuel rods are axially loaded into the assembly, it is difficult to insure that all rods are positioned at the proper level, and it is common for certain ones of the rods to be loaded at an improper level. When this occurs, the nozzle, at one end of the assembly must be disassembled so as to permit the misaligned fuel rods to be manipulated and the gap distance to be corrected. As will be apparent, the required disassembly and subsequent reassembly of the nozzle is a time consuming and thus expensive operation.

The prior to Doss et al, U.S. Pat. No. 4,265,010, discloses a tool for adjusting the level of a fuel rod in a fuel assembly, and which is designed to avoid the necessity of disassembling the nozzle to correct the level of misaligned rods. In particular, the tool includes one end which is insertable between the nozzle and the exposed ends of the fuel rods, and the insertable end includes two plates which may be laterally separated by actuating a threaded interconnection between the plates, to thereby move the misaligned fuel rod with respect to the nozzle. While this tool represents a significant improvement in the art, the tool must be carefully used to insure that the final spacing is correct, and also to insure that no lateral forces are imparted to the rod which could adversely effect its lateral separation from the adjacent rods in the assembly.

It is accordingly an object of the present invention to provide an apparatus and method for adjusting the elevation of a fuel rod in a nuclear reactor fuel assembly, and which is adapted to efficiently adjust the level of individual rods without requiring the disassembly of an end nozzle.

It is also an object of the present invention to provide an apparatus and method of the described type which is adapted to adjust the gap between a misaligned rod and the nozzle to a predetermined maximum distance, which corresponds to the proper gap distance.

It is still another object of the present invention to provide an apparatus and method of the described type which does not exert an unacceptable lateral force on the fuel rod during axial movement thereof.

SUMMARY OF THE INVENTION

These and other objects and advantages of the present invention are achieved in the embodiment illustrated herein by the provision of an apparatus and method which includes a tool comprising an expander having two elongate generally parallel and laterally spaced apart arms extending in a longitudinal direction, and with the two arms including first laterally aligned ends which are fixedly interconnected to each other and opposite laterally aligned free ends. At least one of the arms is readily flexible and so as to permit lateral movement of the free ends toward and away from each other. The tool also includes an actuator operatively mounted to the expander so as to be disposed between the two arms and so as to be movable with respect to the expander. Cooperating surface means is mounted to the arms of the expander and to the actuator for laterally separating the free ends of the arms to a predetermined maximum distance upon movement of the actuator in a predetermined direction with respect to the arms.

In a preferred embodiment, the cooperating surface means comprises an opposing pair of inclined surfaces mounted to the arms, and oppositely facing diverging surfaces mounted to the actuator. Also, the cooperating surface means further includes an opposing pair of generally parallel surfaces mounted to the arms adjacent the laterally closest ends of the pair of inclined surfaces, and the actuator includes a pair of parallel outer surfaces mounted adjacent the laterally most separated ends of the diverging surfaces. Thus the arms may be spaced apart by said predetermined maximum distance when the pair of parallel outer surfaces of the actuator is positioned between the generally parallel surfaces of the arms.

The method of the present invention includes the steps of positioning the above described tool between a nozzle of the fuel assembly and the end of a fuel rod located at an incorrect level which is unduly close to the nozzle, and with the free ends of the arms disposed in an initial position wherein the free ends are relatively closely spaced and disposed directly between the nozzle and the end of such fuel rod. The actuator is then longitudinally moved with respect to the arms so as to laterally separate the arms to an expanded position wherein the free ends are separated said predetermined maximum distance. Thereafter, the actuator is moved in the opposite direction and the tool is removed from the fuel assembly.

The method preferably also includes the step of maintaining the free ends of the arms substantially parallel to each other during movement from the initial position to the expanded position so as to avoid lateral forces being imparted to the misaligned fuel rod. This may be accomplished by manually pressing the arms toward each other so that the arms flex and the free ends assume a parallel relationship during such movement.

BRIEF DESCRIPTION OF THE DRAWINGS

Some of the objects and advantages of the present invention having been stated, others will appear as the description proceeds when taken in conjunction with the accompanying drawings, in which FIG. 1 is a perspective view of the lower end portion of a nuclear fuel assembly, and illustrating the tool of the present invention just prior to being inserted into the assembly;

FIG. 2 is a side elevation view of the tool in its configuration during the insertion of the tool into the fuel assembly;

FIG. 3 is a view similar to FIG. 2 but illustrating the tool in its configuration wherein the arms are separated by a predetermined maximum distance; and FIG. 4 is a perspective view of the tool in the configuration shown in FIG. 3.

DETAILED DESCRIPTION OF THE PREFERRED EMBODIMENT

Referring more particularly to the drawings, FIG. 1 illustrates the lower portion of a conventional nuclear fuel assembly 10 of the type commonly used in commercial nuclear power reactors. The assembly 10 comprises a plurality of fuel rods 12, each of which encloses a stack of fuel elements inside a tube, with the tube being sealed at each end by end plugs. The fuel rods 12 are assembled in a square array when viewed in cross section, which typically measures about twenty one centimeters along each side, and the rods are held in a laterally spaced apart arrangement by a "skeleton" which includes a number of grids 14 which are spaced at lengthwise intervals. The individual fuel rods are mounted to the grids by means of spring mountings (not shown), which permit limited axial movement of each rod. Control rod guide thimbles 16 extend parallel to the rods 12 for interconnection of the grids 14, and the guide thimbles 16 extend beyond the ends of the rods 12 and secure top and bottom nozzles, with only the bottom nozzle 17 being shown in FIG. 1. As is well understood by those skilled in the art, a predetermined gap distance D is necessary between each end of each fuel rod and the surface of the adjacent nozzle to assure proper functioning of the fuel rod.

The tool of the present invention is indicated generally at 18 in the drawings, and comprises an expander 20 composed of two elongate generally parallel and laterally spaced apart arms 21, 22, which extend in a longitudinal direction. The arms are each composed of a relatively thin, flat metallic strip having a substantially smooth and flat outer surface, and the two arms include first laterally aligned ends 23, 24 and opposite laterally aligned free ends 25, 26. The expander 20 also includes a yoke 28 composed of a block of metallic material which is fixedly interconnected between the first ends 23, 24 of the two arms. The opposite free ends 25, 26 of the arms are thus readily flexible and movable toward and away from each other in the lateral direction.

The tool 18 further includes an actuator 30 positioned between and parallel to the two arms of the expander, and the actuator 30 includes a first end portion which extends freely through a longitudinal opening 32 in the yoke 28 so as to be axially movable with respect thereto, and the opening 32 has a square cross section. The first end portion is composed of a segment 33 of square cross section which is closely received in the opening 32, and which has a conforming square cross section. Also, the first end portion includes an outer threaded rod segment 34, which threadedly mounts a nut 35 which is positioned on the side of the yoke 28 opposite the free ends 25, 26 of the arms.

The actuator 30 also includes an enlarged opposite end portion 36 which is positioned between the free ends of the arms. In addition, the tool 18 includes cooperating wedge surface means mounted to the arms and the actuator, for laterally separating the free ends of the arms upon longitudinal movement of the actuator in a predetermined direction with respect to the arms. This wedge surface means includes a plate 38 mounted on the inside of each of the arms, with the plates 38 defining an opposing pair of inclined surfaces 40, 41 positioned on respective ones of the free ends of the arms. Also, an oppositely facing pair of diverging surfaces 43, 44 are positioned on the opposite end portion 36 of the actuator. The diverging surfaces 43, 44 are adapted to be positioned between the opposing pair of inclined surfaces 40, 41, and such that axial movement of the actuator toward the right as seen in FIGS. 2–4 causes the divering surfaces to be drawn between the inclined surfaces so as to spread apart the free ends of the arms. Axial movement toward the left acts to remove the diverging surfaces from between the inclined surfaces to release the free ends of the two arms.

The cooperating wedge surface means of the tool further includes an opposing pair of generally parallel second surfaces 46, 47 positioned on the plates 38 and so as to be positioned on respective ones of the free ends of the arms adjacent the laterally closest ends of the pair of inclined surfaces 40, 41, i.e. on the right side of the inclined surfaces as seen in FIGS. 2–4. These second surfaces 46, 47 are essentially parallel to each other when the arms are laterally spaced apart the predetermined distance D as shown in FIG. 3. The wedge surface means further includes a pair of oppositely facing outer surfaces 49, 50 mounted to the actuator and which are parallel to each other and positioned immediately adjacent the laterally most separated ends of the diverging surfaces 43, 44, i.e. at the left end of the diverging surfaces as seen in FIGS. 2–4. The distance between the parallel oppositely facing outer surfaces 49, 50 is designed so as to cause the arms to be laterally separated by the predetermined distance D when the actuator is axially moved so that the parallel outer surfaces are positioned directly between the opposing second surfaces of the arms as shown in FIG. 3, and the predetermined distance D is the maximum distance that the arms may be separated by the actuator.

Viewing FIG. 2, it will be noted that the fuel rod 12' is illustrated to be at a level below the level of the remaining rods 12, and thus this fuel rod 12' needs to be adjusted upwardly. To effect this adjustment, the tool 18 is initially configured as shown in FIG. 2, and so that the free ends 25, 26 assume an initial closely spaced apart relationship. The forward or free end of the tool 18 is then inserted into the assembly between the nozzle 17 and the level of the lower ends of the fuel rods 12, and so that the free ends 25, 26 of the arms are disposed directly between the surface of the nozzle 17 and the end of the fuel rod 12'. Also, the two arms are manually pressed toward each other so that one or both of the arms flex inwardly and the free ends assume a relatively closely spaced apart and parallel relationship as seen in dashed lines in FIG. 2. The nut 35 is then manually rotated, so as to longitudinally move the actuator to the right as seen in FIGS. 2–4, and the conforming square profiles of the segment 33 of the actuator and the opening 32 through the yoke 28 serve to preclude relative rotation therebetween. Thus the actuator is moved longitudinally, and the wedging action between the inclined surfaces 40, 41 and the outer diverging surfaces 43, 44 acts to laterally separate the arms to the desired predetermined distance D, and shown in FIG. 3. Any further advance of the actuator to the right from the position shown in FIG. 3 will not change the separation of the arms, since the contacting surfaces are then parallel to each other. Thus further movement will not separate the arms beyond the desired predetermined maximum separation, which by design conforms to the desired separation distance D between the surface of the nozzle and the ends of the rods. In addition, the manual flexing of the arms is preferably maintained during the movement from the closely spaced apart initial position as seen in FIG. 2 to the expanded position as seen in FIG. 3, so as to maintain a parallel relationship of the free ends 25, 26 during such movement and thereby avoid lateral forces being imparted to the misaligned fuel rod 12'. Once the rod 12' has been adjusted upwardly to its proper position, the nut 35 is threaded in the reverse direction and the actuator is then moved to the left as seen in FIGS. 2–4. The two arms are then manually pressed toward each other so as to return to the initial closely spaced position, and the tool may then be removed from the assembly. In the event fuel rods are at an elevation above the proper level with respect to the bottom nozzle 17, the tool of the present invention is moved to the top of the assembly and placed between the top nozzle (not shown) and the top end of the fuel rods. The misaligned fuel rod is then moved downwardly by a corresponding procedure.

The expander 20 of the tool 18 of the present invention typically measures about seventeen centimeters in longitudinal length, and so that the free ends of the arms may be inserted into the space between the ends of the rods and the surface of the nozzle and reach a position below any one of the fuel rods 12. Also, the tool is preferably constructed entirely of stainless steel or similar non-corrosive metallic material, so as to avoid any possible contamination of the fuel assembly.

As noted above, the two arms 21, 22 of the expander are preferably manually deflected to assume a substantially parallel relationship as they are laterally moved apart by the longitudinal movement of the actuator, and thus a misaligned fuel rod may be moved upwardly without being subjected to any substantial lateral bending forces. Further, since the fuel rod is in contact with the generally flat and smooth exterior surface of the upper arm, the likelihood of a lateral force being applied to the rod is even further reduced.

From the above description, it will be apparent that the tool 18 of the present invention permits the gap between the fuel rods 12 and nozzle 17 to be corrected by moving any misaligned fuel rod without requiring the nozzle to be removed from the fuel assembly. Also, the tool provides for such correction of the gap separation without risking undue lateral forces being applied to the end of the rod.

In the drawings and specification there has been set forth a preferred embodiment of the invention and although specific terms are employed, they are used in a generic and descriptive sense only and not for purposes of limitation.

We claim as our invention:

1. A tool adapted for adjusting the level of a nuclear fuel rod in a fuel assembly and comprising
   an expander comprising two elongate generally parallel and laterally spaced apart arms extending in a longitudinal direction, each arm having a substantially smooth and flat outer surface, with the two arms including first laterally aligned ends which are fixedly interconnected to each other and opposite laterally aligned free ends, and with at least one of the arms being flexible so as to permit lateral movement of said free ends toward and away from each other,
   an actuator operatively mounted to said expander so as to be disposed between said two arms and being movable with respect thereto, and
   cooperating surface means mounted to said arms and said actuator for laterally separating said free ends of said arms to a predetermined maximum distance upon movement of said actuator with respect to said arms, said cooperating surface means comprising
   an opposing pair of inclined surfaces positioned on respective ones of said arms, and an oppositely facing pair of diverging surfaces positioned on said actuator, and wherein said actuator is movable with respect to said expander so as to permit said oppositely facing pair of diverging surfaces to be drawn between said opposing pair of inclined surfaces,
   an opposing pair of generally parallel surfaces positioned on respective ones of said arms adjacent the laterally closest ends of said pair of inclined surfaces, and
   a pair of parallel oppositely facing outer surfaces positioned on said actuator adjacent the laterally most separated ends of said diverging surfaces, and such that said flat outer surfaces of said arms are spaced apart by said predetermined maximum distance when said pair of parallel oppositely facing outer surfaces of said actuator are positioned between said opposing pair of generally parallel surfaces of said arms.

2. A tool adapted for adjusting the level of a nuclear fuel rod in a fuel assembly and comprising
   an expander comprising two elongate generally parallel and laterally spaced apart arms extending in a longitudinal direction, each arm having a substantially smooth and flat outer surface, with the two arms including first laterally aligned ends and opposite laterally aligned free ends, and a yoke positioned between and fixedly interconnecting said first ends of said arms, and with said arms being flexible so as to permit lateral movement of said free ends toward and away from each other,
   an actuator positioned between and parallel to the two arms of said expander, said actuator including a first end portion extending freely through said yoke so as to be longitudinally movable with respect thereto, and an opposite end portion,
   cooperating wedge surface means mounted to said arms and said actuator for laterally separating said free ends of said arms upon longitudinal movement of said actuator in a predetermined direction with respect to said arms, said wedge surface means including an opposing pair of inclined surfaces positioned on respective ones of said free ends of said arms, and an oppositely facing pair of diverging surfaces positioned on said opposite end portion of said actuator, with said diverging surfaces being adapted to be positioned between said opposing pair of inclined surfaces, and such that longitudinal movement of the actuator in said predetermined direction causes said divering surfaces to be drawn between said inclined surfaces to spread apart said free ends of said arms, and axial movement in the other direction acts to remove said diverging surfaces from between said inclined surfaces to release the free ends of said two arms, said wedge surface means further including an opposing pair of second surfaces positioned on respective ones of said free ends of said arms and adjacent the laterally closest ends of said pair of inclined surfaces, with said second surfaces being parallel to each other when said arms are laterally spaced apart a predetermined distance, and wherein said wedge surface means further includes a pair of oppositely facing outer surfaces positioned on said opposite end portion of said actuator and which are parallel to each other and positioned immediately adjacent the laterally most separated ends of said diverging surfaces, and with the distance between said parallel oppositely facing outer surfaces being such as to cause said flat outer surfaces of said arms to be laterally separated by said predetermined distance when said actuator is axially moved so that said parallel outer surfaces are positioned directly between said opposing pair of second surfaces on said arms.

3. The tool as defined in claim 2 wherein said one end portion of said actuator includes a threaded rod, and said actuator further includes a nut threadedly received upon said threaded rod and which is positioned on the side of said yoke opposite said free ends of said arms.

4. The tool as defined in claim 3 further comprising interengaging surface means positioned on said expander and said actuator for precluding relative rotation between said expander and actuator about the axis of said threaded rod, and such that rotation of said nut facilitates the longitudinal movement of the actuator with respect to said arms.

5. The tool as defined in claim 2 wherein each of said arms includes a relatively thin, flat metallic strip.

6. The tool as defined in claim 2 wherein said opposing pair of inclined surfaces, said oppositely facing pair of diverging surfaces, said opposing pair of second surfaces, and said pair of oppositely facing outer surfaces are all flat surfaces.

* * * * *